United States Patent
Kang et al.

(10) Patent No.: US 10,034,039 B2
(45) Date of Patent: Jul. 24, 2018

(54) DISPLAY DEVICE, METHOD FOR CONTROLLING THE SAME, AND COMPUTER-READABLE RECORDING MEDIUM

(71) Applicant: SAMSUNG ELECTRONICS CO., LTD., Suwon-si (KR)

(72) Inventors: Ji-hong Kang, Seoul (KR); Sergei Sudakov, Suwon-si (KR); Jae-min Soh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/203,944

(22) Filed: Jul. 7, 2016

(65) Prior Publication Data

US 2017/0064375 A1    Mar. 2, 2017

(30) Foreign Application Priority Data

Aug. 24, 2015 (KR) .................. 10-2015-0118863

(51) Int. Cl.
*H04N 5/445* (2011.01)
*H04N 21/431* (2011.01)
*H04N 21/44* (2011.01)
*H04N 21/439* (2011.01)

(52) U.S. Cl.
CPC ..... *H04N 21/4316* (2013.01); *H04N 21/4394* (2013.01); *H04N 21/44008* (2013.01)

(58) Field of Classification Search
CPC ......... H04N 21/4316; H04N 21/44008; H04N 21/44213
See application file for complete search history.

(56) References Cited

U.S. PATENT DOCUMENTS

| 8,955,005 | B2 | 2/2015 | Gava et al. | |
|---|---|---|---|---|
| 2005/0271254 | A1* | 12/2005 | Hougen | G06K 9/00651 382/104 |
| 2006/0044472 | A1* | 3/2006 | Lee | G09G 3/20 348/607 |
| 2008/0130997 | A1* | 6/2008 | Huang | G06K 9/3266 382/181 |
| 2012/0182311 | A1* | 7/2012 | Watanabe | H04N 7/013 345/629 |

(Continued)

FOREIGN PATENT DOCUMENTS

| KR | 1020050121823 A | 12/2005 |
|---|---|---|
| KR | 1020060024687 A | 3/2006 |

(Continued)

*Primary Examiner* — Gigi L Dubasky
(74) *Attorney, Agent, or Firm* — Sughrue Mion, PLLC

(57) ABSTRACT

A display device, including a communication interface configured to receive an input image from an external device; a display configured to display the received input image; a controller configured to detect an On Screen Display (OSD) overlaid on the input image in an image section satisfying a predetermined condition; and a storage configured to store information included in the detected OSD, wherein the predetermined condition includes at least one from among a black image being displayed on a part of the input image or being within a predetermined time after occurrence of a silent sound.

19 Claims, 13 Drawing Sheets

(56) References Cited

U.S. PATENT DOCUMENTS

| | | | |
|---|---|---|---|
| 2014/0101683 A1* | 4/2014 | Arshavski | H04N 5/147 |
| | | | 725/14 |
| 2014/0282668 A1* | 9/2014 | Gava | H04N 21/44213 |
| | | | 725/19 |
| 2015/0042882 A1 | 2/2015 | Park et al. | |
| 2016/0094868 A1* | 3/2016 | Singhal | H04N 21/44008 |
| | | | 725/38 |

FOREIGN PATENT DOCUMENTS

| KR | 1020070070630 A | 7/2007 |
|---|---|---|
| KR | 1020140046370 A | 4/2014 |
| KR | 1020140113286 A | 9/2014 |
| KR | 1020150017274 A | 2/2015 |

* cited by examiner

DISPLAY DEVICE, METHOD FOR CONTROLLING THE SAME, AND COMPUTER-READABLE RECORDING MEDIUM

CROSS-REFERENCE TO RELATED APPLICATIONS

This application claims priority, under 35 U.S.C. § 119, from Korean Patent Application No. 10-2015-0118863, filed on Aug. 24, 2015, in the Korean Intellectual Property Office, the disclosure of which is incorporated herein by reference in its entirety.

BACKGROUND

1. Field

The present disclosure generally relates to a display device, a method for controlling the same, and a computer-readable recording medium, and more particularly, to a display device for detecting an On Screen Display (OSD) overlaid on an image in an image section satisfying a predetermined condition, a method for controlling the same, and a computer-readable recording medium.

2. Description of Related Art

With the prevalence of a television (TV) and the development of a smart phone and mobile communication, a rate of receiving and viewing a broadcast and a content through a charged cable service or internet network has increased greatly as compared with a rate of receiving and viewing a terrestrial broadcast through a TV tuner. In addition, with the recent development of a smart TV, it became possible to provide a program recommendation service based on a user's viewing history.

In this case, a broadcast content is reproduced though a set-top box. A TV simply receives an image decoded in the set-top box, displays the received image in a screen, and reproduces audio. In this regard, in order to obtain information on an image which a user views currently, such as, a channel number, a channel name, a program name, and the like, the TV should be connected to a network. In addition, each content provider should collect and store forms of different OSDs in advance and update the OSDs continuously.

Accordingly, there is a need for a method for automatically recognizing a form of an OSD in an image without receiving preliminary information on the form of the OSD from an external source.

SUMMARY

The present disclosure has been provided to address the aforementioned and other problems and disadvantages occurring in the related art, and an aspect of the present disclosure provides a display device for detecting an OSD overlaid on an image in an image section satisfying a predetermined condition, a method for controlling the same, and a computer-readable recording medium.

According to an aspect of an exemplary embodiment, a display device includes a communication interface configured to receive an input image from an external device; a display configured to display the received input image; a controller configured to detect an On Screen Display (OSD) overlaid on the input image in an image section in response to a predetermined condition being satisfied; and a storage configured to store information included in the detected OSD, wherein the predetermined condition includes at least one from among a black image being displayed on a part of the input image or being within a predetermined time after occurrence of a silence in an audio signal associated with the input image.

The controller may be further configured to generate an OSD template including at least one from among location information or form information associated with the detected OSD, and to store the generated OSD template in the storage.

The controller may be further configured to generate the OSD template by generating a difference image based on a frame in the image section, and a previous frame corresponding to the frame, binarizing the difference image, accumulating the difference image, and determining an area in which an accumulated value associated with the area, the accumulated value being generated by the accumulating, exceeds a predetermined value as an OSD area.

The controller may be further configured to compare a currently displayed image with the stored OSD template and to determine whether the OSD is overlaid on the currently displayed image.

The controller may be further configured to generate a difference image based on a frame of the currently displayed image and the OSD template, to binarize the generated difference image, and when a ratio between a size of an area substituted by '1' in the binarized difference image and a size of an OSD area in the OSD template being within a predetermined range, to determine that the OSD is included in the currently displayed image.

The controller may be further configured to extract the information included in the detected OSD.

The information may include at least one of a channel number, a channel name, a current time, a program name, a program broadcasting time, and program information.

The controller may be further configured to extract the information included in the detected OSD based on a pre-stored OSD template, wherein the OSD template may include location information associated with the information.

The OSD template may be generated by detecting an area in the detected OSD comprising numbers using a character recognition method, determining the detected area as a channel number area, detecting a character area adjacent to the determined channel number area, matching the detected character area with a pre-stored channel name database, and determining the character area as a channel name area.

According to another aspect of an exemplary embodiment, a method for controlling a display device includes receiving an input image from an external device; displaying the received input image; detecting, in response to a predetermined condition being satisfied, an On Screen Display (OSD) overlaid on the displayed input image; and storing information included in the detected OSD, wherein the predetermined condition may include at least one from among a black image being displayed on a part the displayed input image or being within a predetermined time after occurrence of a silence in an audio signal associated with the input image.

The method may further include: generating an OSD template including at least one from among location information or form information associated with the detected OSD; and storing the generated OSD template.

The generating the OSD template may include: generating a difference image between a frame in an image section satisfying the predetermined condition and a previous frame corresponding to the frame; binarizing the generated difference image; accumulating the difference image; and determining an area in which an accumulated value associated with the area, the accumulated value being generated by the accumulating, exceeds a predetermined value as an OSD area.

The method may further include: comparing a currently displayed image with the stored OSD template and determining whether the OSD is overlaid on the currently displayed image.

The determining may include: generating a difference image based on a frame of the currently displayed image and the OSD template; binarizing the generated difference image; and when a ratio between a size of an area substituted by '1' in the binarized difference image and a size of an OSD area in the OSD template is within a predetermined range, determining that the OSD is overlaid on the currently displayed image.

The method may further include: extracting the information included in the detected OSD.

The information may include at least one of a channel number, a channel name, a current time, a program name, a program broadcasting time, and program information.

The extracting the information may include extracting information included in the detected OSD based on a pre-stored OSD template, wherein the OSD template may include location information on the information.

The generating the OSD template may include: detecting an area comprising numbers using a character recognition method; determining the detected area as a channel number area; detecting a character area adjacent to the determined channel number area; and matching the detected character area with a pre-stored channel name database and determining the character area as a channel name area.

According to a further aspect of an exemplary embodiment, a computer-readable recording medium with a program for executing a method for controlling a display device includes receiving an input image from an external device; displaying the received input image; detecting, in response to a predetermined condition being satisfied, an On Screen Display (OSD) overlaid on the displayed input image; and storing information included in the detected OSD, wherein the predetermined condition may include at least one from among a black image being displayed on a part the displayed input image or being within a predetermined time after occurrence of a silence in an audio signal associated with the input image.

BRIEF DESCRIPTION OF THE DRAWINGS

The above and/or other aspects of the disclosure will be more apparent by describing certain exemplary embodiments with reference to the accompanying drawings, in which.

DETAILED DESCRIPTION

Figure 1:
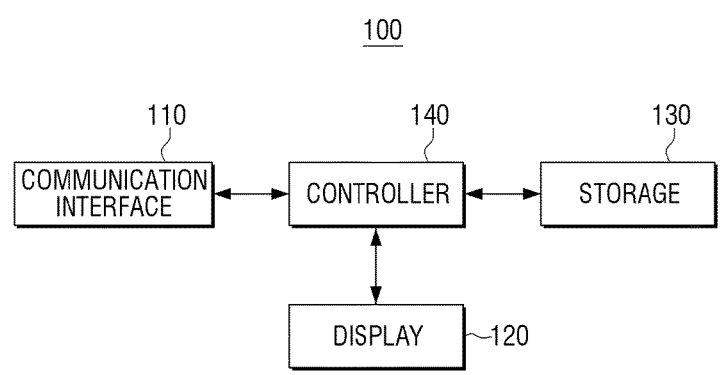
FIG. 1 is a block diagram illustrating a structure of a display device according to an exemplary embodiment of the present disclosure.

Certain exemplary embodiments are described in greater detail below with reference to the accompanying drawings. In the following description, if it is determined that a specific description on a known function or element may obscure the gist of the present disclosure unnecessarily, the specific description is omitted. In addition, the following exemplary embodiments may be carried out in diverse types, and the scope of the technical concept of the present disclosure is not limited to the exemplary embodiments. The exemplary embodiments are provided to make the present disclosure more perfect and substantial and to help with better understanding on the technical concept of the present disclosure of a person having ordinary skill in the art (hereinafter referred to as 'those skilled in the art').

In the following description, the expression that a part 'includes' a certain element signifies that the part may further include other elements on top of the certain element, not excluding the other elements than the certain element, unless otherwise described. In addition, various elements and areas in the accompanying drawings are illustrated schematically. Accordingly, the technical concept of the present disclosure is not limited by a relative size or distance in the drawings.

FIG. 1 is a block diagram illustrating a structure of a display device according to an exemplary embodiment of the present disclosure.

Referring to FIG. 1, a display device 100 includes a communication interface 110, a display 120, a storage 130, and a controller 140.

The display device 100 displays diverse screens through the display. The displays device 100 may include a TV, a monitor, a tablet Personal Computer (PC), a Portable Multimedia Player (PMP), a Personal Digital Assistant (PDA), a smart phone, a mobile phone, a digital picture frame, a game console, and so on.

The communication interface 110 may connect the display device 100 to an external device, such as, a set-top box or a server (not shown), in a wireless and/or wired manner by control of the controller 140. The communication interface 110 may transmit/receive a content to/from the external device, download an application, or perform a web-browsing operation by the control of the controller 140.

The communication interface 110 may include one of a High Definition Multimedia Interface (HDMI), a component, a composite terminal, a wireless Local Area Network (LAN), a local area communication unit, and a wired Ethernet or a combination thereof, in response to performance and the structure of the display device 100.

For example, the local area communication unit may perform the communication by Bluetooth low energy, Infrared Data Association (IrDA), Wireless-Fidelity (Wi-Fi) Direct, Ultra Wide Band (UWB), and Near Field Communication (NFC), as well as Bluetooth.

The communication interface 110 may receive a remote control signal (including a control signal) from a remote control device (not shown) by the control of the controller 140. In this case, remote control refers to an operation of electrically or mechanically controlling a device located at a long range to control power or volume of the device. The electric control operation may be performed in a wired manner or in a wireless manner. The remote control signal received from the remote control device (not shown/for example, a remote controller) may be realized as a Bluetooth type or in a Radio Frequency (RF) signal type.

The display 120 displays an image received from the external device (not shown). The received image may include an image where an On Screen Display (OSD) is overlaid.

The OSD refers to a window displayed in a screen, which enables a user to optimize the screen by himself by adjusting screen brightness, contrast, tuning, RGB, a screen size, and a location, and the like. In the present disclosure, the OSD refers to a window for displaying and enabling the user to select information including a content, such as, a menu for selecting a content, a channel information banner including information on a program which is currently broadcasted, a pop-up window, and so on, other than a content which is being reproduced, as well as enabling the user to control the screen.

The display 120 may display a content (for example, a video image or text) received through the communication interface 110 or an input/output unit (not shown). The display 120 may output a video stored in the storage 130. In addition, the display 120 may include a voice User Interface (UI/for example, including a voice command guide) for performing a voice recognition task or a motion UI (for example, including a user motion guide for motion recognition) for performing a motion recognition task corresponding to the motion recognition.

The screen resolution of the display 120 may be higher than resolution of High Definition (HD), full HD, or ultra HD.

A diagonal length of the display device 120 may include a length less than 650 mm, a length of 660 mm, a length of 800 mm, a length of 1,010 mm, a length of 1,520 mm, a length of 1,890 mm, or a length over 2,000 mm, for example. A horizontal to vertical ratio of the display 120 may include 4:3, 16:9, 16:10, 21:9, or 21:10, for example.

The storage 130 may store a control program for controlling the display device 100 and the controller 140, an application provided by a manufacturer or downloaded from an external source, a Graphic User Interface (GUI) related to an application, an object for providing a GUI (for example, image text, an icon, a button, and the like), user information, a document, databases, or related data. For example, the user information may include a user identifier (ID), a password, a user name, and the like.

The storage 130 may include various software modules including a broadcast receiving module, a channel control module, a volume control module, a communication control module, a voice recognition module, a motion recognition module, a light receiving module, a display control module, an audio control module, an external input control module, a power control module, a power control module of a portable device connected wirelessly (for example, Bluetooth), and the like, a voice database (DB), a motion DB, or a channel name DB, which are not shown.

The above-mentioned modules and databases which are not illustrated may be realized as software so as to perform a broadcast receiving control function, a channel control function, a volume control function, a communication control function, a voice recognition function, a motion recognition function, a light receiving control function, a display control function, an audio control function, an external input control function, a power control function or the display device 100 or to perform a power control function of the portable device connected wirelessly (for example, Bluetooth). The controller 140 may perform the respective functions by using the software stored in the storage 130.

The storage 130 may store an OSD template generated by using an OSD overlaid on an image in a section satisfying a predetermined condition by the controller 140 and information included in an OSD displayed in an image which is currently displayed.

In this case, a template refers to a certain pattern of a drawing or an image which is preset so as to be frequently used as a basic structure of a certain diagram or format. In the present disclosure, the template refers to information on a design, a form, a location, a color value of an OSD, which is pre-stored to determine whether the OSD is included in a present input image.

In the exemplary embodiments, the term 'storage of the display device 100' includes the storage 130, a Read-Only Memory (ROM) of the controller 140, a Random Access Memory (RAM), or a memory card mounted in the display device 100 (for example, a micro Secure Digital (SD) card, a Universal Serial Bus (USB) memory/not shown). In addition, the storage 130 may include a non-volatile memory, a volatile memory, a Hard Disk Drive (HDD), and a Solid State Drive (SSD).

The controller 140 may include a processor, a ROM including a control program for controlling the display device 100, and a RAM for storing a signal or data received from outside of the display device 100 or for being used as a storage area corresponding to various operations performed in the display device 100.

The controller 140 controls overall operations of the display device 100 and a signal flow in the components 110 to 130 in the display device 100 and processes data. The controller 140 controls power supplied to the internal components from a power supply unit. In response to a user's input being received or a predetermined condition being satisfied, the controller 140 may execute an Operating System (OS) or diverse applications in the storage 130.

The processor may include a Graphic Processing Unit (GPU) for processing graphic corresponding to an image or a video. The processor may be realized as a System On Chip (SoC) where a core (not shown) and the GPU (not shown) are combined. The processor may include a single-core, a dual-core, a triple-core, a quad-core, and cores in the number of a multiple thereof.

The processor may include a plurality of processors. By way of example, the processor may be realized as a main processor (not shown) and a sub processor (not shown) which operates in a sleep mode. The processor, the ROM, and the RAM may be interconnected through an internal bus.

The controller 140 controls the components of the display device 100. To be specific, the controller 140 may control the communication interface 110 to receive an input image and input audio from the external device.

The controller 140 may control the display 120 to display the received input image. In addition, the controller 140 may control a speaker (not shown) to output the received input audio.

The controller 140 may detect an OSD which is overlaid on the image in the section satisfying the predetermined condition. To be specific, the controller 140 may detect an OSD from a plurality of images where the OSD is overlaid for a certain time after a channel is changed. The controller 140 may generate an OSD template including location information and form information on the OSD overlaid on the image by using the detected OSD and store the generated OSD template in the storage 130.

The controller 140 may extract information included in the detected OSD by using the OSD template detected from a present input image or stored in the storage 130. In this case, OSD information may be extracted by means of a character recognition method (for example, Optical Character Recognition (OCR)), and the extracted information may be stored in the storage 130.

The controller 140 may obtain a user's preferred channel, preferred program, or preferred viewing time from the information stored in the storage 130 and recommend a content to the user or provide the user with information on broadcasting of the preferred program.

In exemplary embodiments, the term 'controller of the display device 100' includes a program, a ROM, and a RAM.

The structure and operations of the controller 140 may be realized in various form depending upon an exemplary embodiment, which may be easily understood by those skilled in the art.

The display device 100 including the above-described components may recognize a form of the OSD from the image automatically, extract the information included in the OSD, and provide the user with convenience by using the extracted information, without receiving preliminary information on the form of the OSD from an external source.

Figure 2:
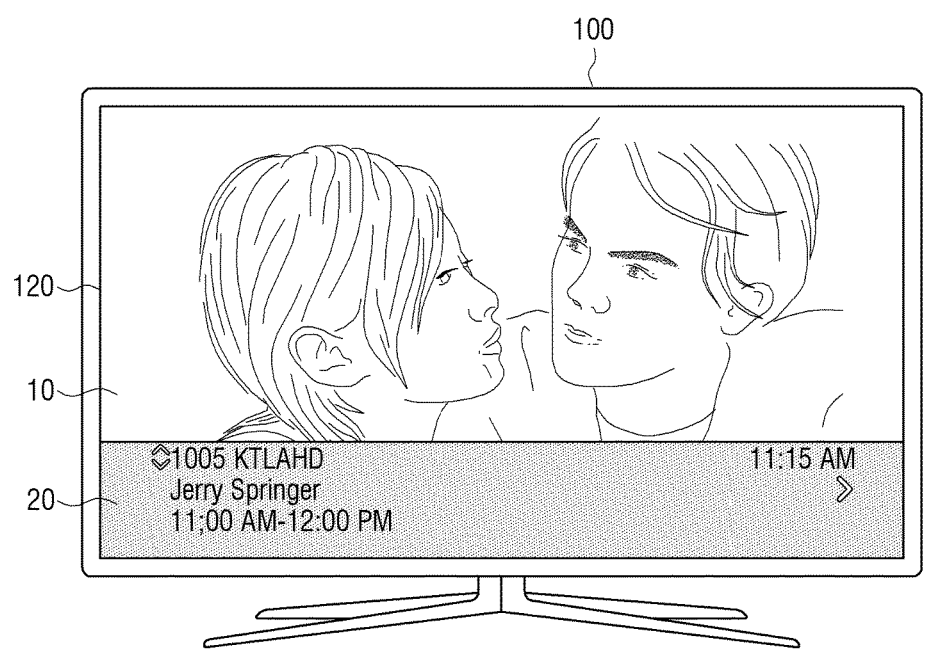
FIGS. 2 and 3 are views provided to describe various examples of a screen where a detected OSD is displayed according to an exemplary embodiment of the present disclosure.
Figure 3:
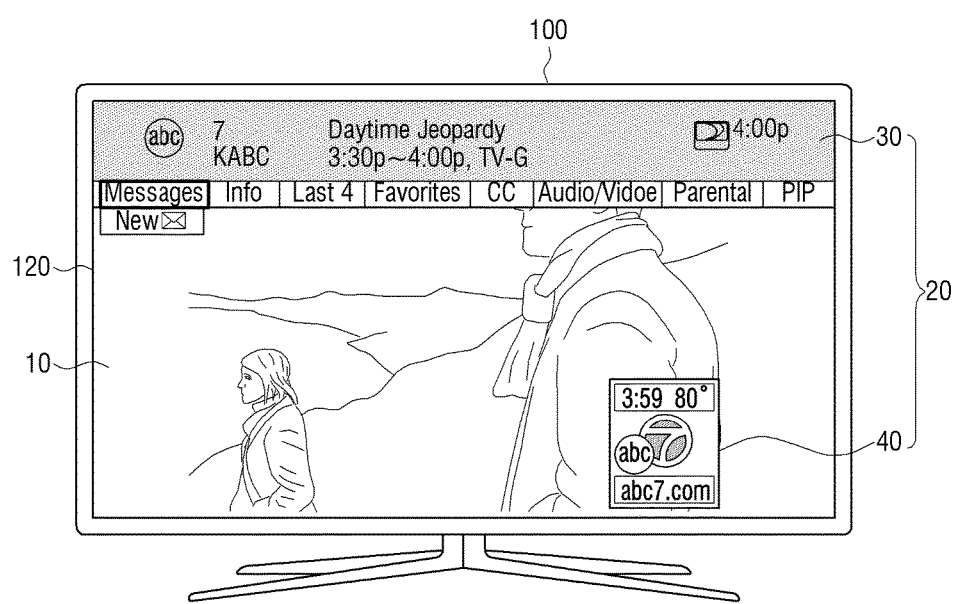

FIGS. 2 and 3 are views provided to describe various examples of a screen where a detected OSD is displayed according to an exemplary embodiment of the present disclosure.

Referring to FIG. 2, the display 120 of the display device 100 may display an image 10 received from the external device. In this case, the image 10 may include an OSD 20 including channel information on the image. As illustrated in FIG. 2, the OSD may be overlaid on a lower part of a screen, generally.

However, as illustrated in FIG. 3, the OSD 20 may include a bar type OSD 30 overlaid on an upper part of the screen or a pop-up type OSD 40 overlaid on a right lower part of the screen. The OSD 20 may be realized in various forms, such as, a bar type OSD or a pop-up type OSD overlaid on both sides of the screen or on a center of the screen.

Figure 4:
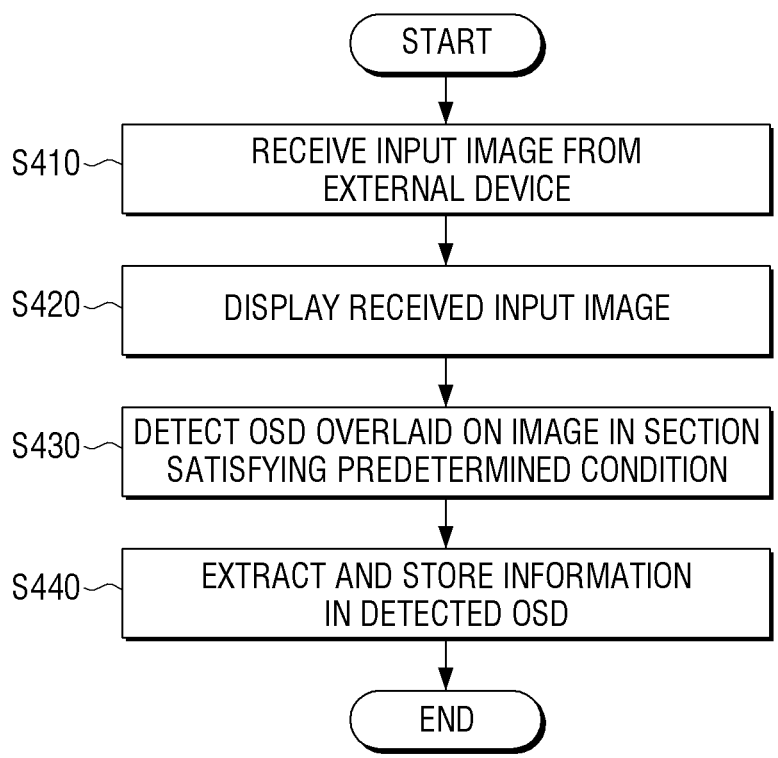
FIG. 4 is a flowchart provided to describe an operation of detecting an OSD according to an exemplary embodiment of the present disclosure.

FIG. 4 is a flowchart provided to describe an operation of detecting an OSD according to an exemplary embodiment of the present disclosure.

Referring to FIG. 4, the display device 100 receives an input image from the external device (not shown) through the communication interface 110 (S410). In this case, the display device 100 may receive input audio along with the input image.

The display device displays the received input image in the display 120 (S420). Subsequently, the display device detects an OSD which is overlaid on the image in the section satisfying the predetermined condition from the displayed input image (S430).

The section satisfying the predetermined condition is a section where a black image is displayed in a part of the image or a section within a predetermined time after occurrence of a silent sound. For example, the section may be a certain section where only an OSD is displayed in a black screen having no input image in response to a channel being changed, which is to extract images while the OSD is overlaid and detect the OSD, because an OSD for displaying the channel information is overlaid in the screen only when the user changes a channel and then disappears after a certain time elapses, without being displayed all the time. In this case, a part of area of the image where the black image is displayed may be the other area than an area where the OSD is overlaid in the image. That is, the part of area of the image where the black image is displayed may be the other area than a part of area on an upper part or a lower part of the screen where the OSD is overlaid.

A detailed description on the method for detecting an OSD will be provided below with reference to FIGS. 6 to 8.

In the above exemplary embodiment, the section satisfying the predetermined condition is a section where a black image is displayed in a part of the image or a section within a predetermined time after occurrence of a silent sound, but this is an example for convenience in explanation, but this is only an example. In the implementation, the predetermined condition may be set variously, for example, a section within a certain time after a channel change RF signal of a set-top box is detected, and so on.

Subsequently, the display device 100 extracts and stores the information in the detected OSD (S440). To be specific, the display device 100 extracts the information in the detected OSD, such as, a channel number, a channel name, a program name, a broadcasting time, and so on, by using the character recognition method and stores the extracted information in the storage 130. In addition, the display device 100 may obtain a user's preferred channel or preferred program from the stored information and recommend the preferred channel or preferred program to the user. An operation of extracting the information in the OSD will be described below in further detail with reference to FIGS. 10 to 12.

Figure 5:
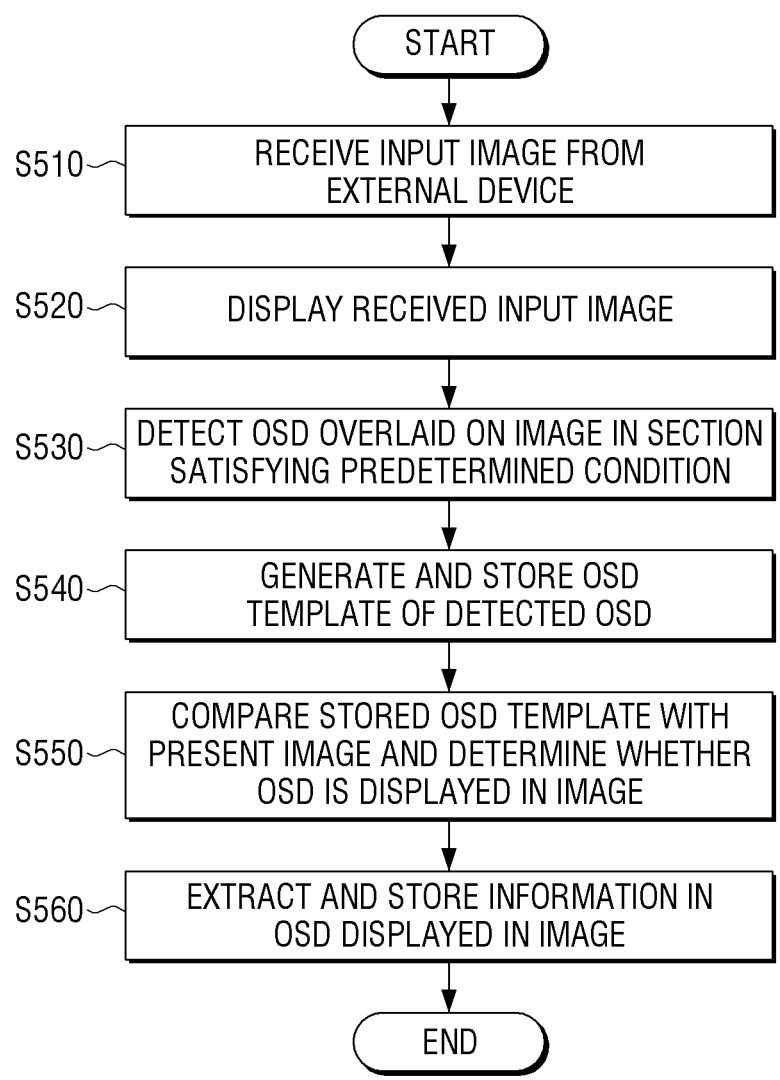
FIG. 5 is a flowchart provided to describe an operation of detecting an OSD according to another exemplary embodiment of the present disclosure.

FIG. 5 is a flowchart provided to describe an operation of detecting an OSD overlaid on a currently displayed image according to another exemplary embodiment of the present disclosure.

Referring to FIG. 5, the display device 100 receives an input image from an external device (not shown) through the communication interface 110 (S510). In this case, the display device 100 may receive input audio along with the input image.

The display device 100 displays the received input image in the display 120 (S520). Subsequently, the display device 100 detects an OSD overlaid on the image in the section satisfying the predetermined condition from the displayed input image (S530).

The display device 100 may generate and store an OSD template by using the detected OSD (S540).

Subsequently, the display device 100 compares the currently displayed image with the stored OSD template to determine whether the OSD is displayed in the currently displayed image and detects the displayed OSD (S550). The method for determining whether an OSD is displayed in a currently displayed image will be described below in further detail with reference to FIGS. 9 and 10.

The display device 100 extracts and stores the information in the detected OSD (S560). To be specific, the display device 100 extracts the information included in the detected OSD, such as, a channel number, a channel name, a program name, a broadcasting time, and the like, and stores the extracted information in the storage 130. The display device 100 may obtain a user's preferred channel or preferred program from the stored information and recommend the preferred channel or preferred program to the user. A detailed description on the operation of extracting the information included in the OSD will be provided below with reference to FIGS. 10 to 12.

Figure 6:
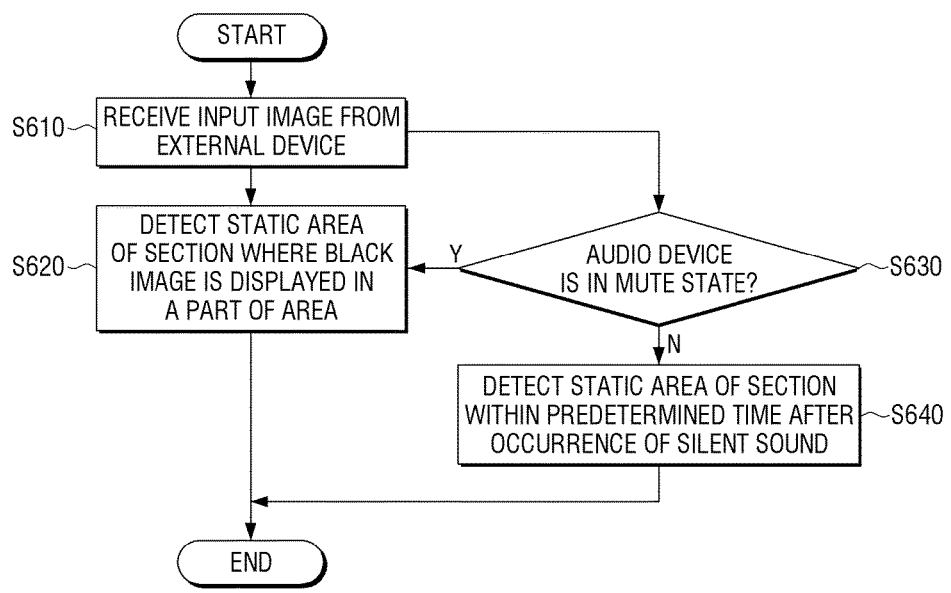
FIG. 6 is a flowchart provided to describe a condition of an image for detecting an OSD according to an exemplary embodiment of the present disclosure.

FIG. 6 is a flowchart provided to describe a condition of an image for detecting an OSD according to an exemplary embodiment of the present disclosure.

Referring to FIG. 6, the display device 100 receives an input image from an external device (S610). In this case, the display device 100 may receive input audio along with the input image. Subsequently, the display device 100 detects a static area from the image in the section satisfying the predetermined condition (S620 and S640). For example, an OSD is not displayed in the screen all the time. However, the OSD is overlaid on the image and displayed for a certain time after the channel change, for example, for one second or two seconds. Accordingly, the display device 100 detects the OSD by using the image where the OSD is overlaid in response to the channel change. In this case, the certain time that the OSD is overlaid after the channel change may be set by default or may be set by a user's setting. In the above exemplary embodiment, the OSD is overlaid on the image in response to the channel change. However, in the implementation, various conditions, for example, displaying the OSD for a certain time in response to an OK button being pressed, may be applied. In addition, a length of the section satisfying the predetermined condition may be changed by the user's setting.

To be specific, the display device 100 detects the static area in a section where a black image is displayed in response to the channel change (S620). Alternatively, the display device 100 determines a state of an audio device (S630) of the display. In response to determining that the audio device is in a mute state (S630-Y), the display device 100 proceeds to operation S620 and detects the static area from the section where the black image is displayed in a part of image, which is expected that the OSD is displayed according to the channel change. In response to determining that the audio device is not in the mute state (S630-N), the display device 100 detects the static area from a section within a predetermined time after the silent sound occurs in response to the channel change (S640). That is, in response to the audio device not being in the mute state, the images in the both sections may be used together, and in response to the audio device being in the mute state, only the section where the black image having the OSD is displayed may be used.

A detailed description on the method for detecting the static area will be provided below with reference to FIG. 8.

Figure 7:
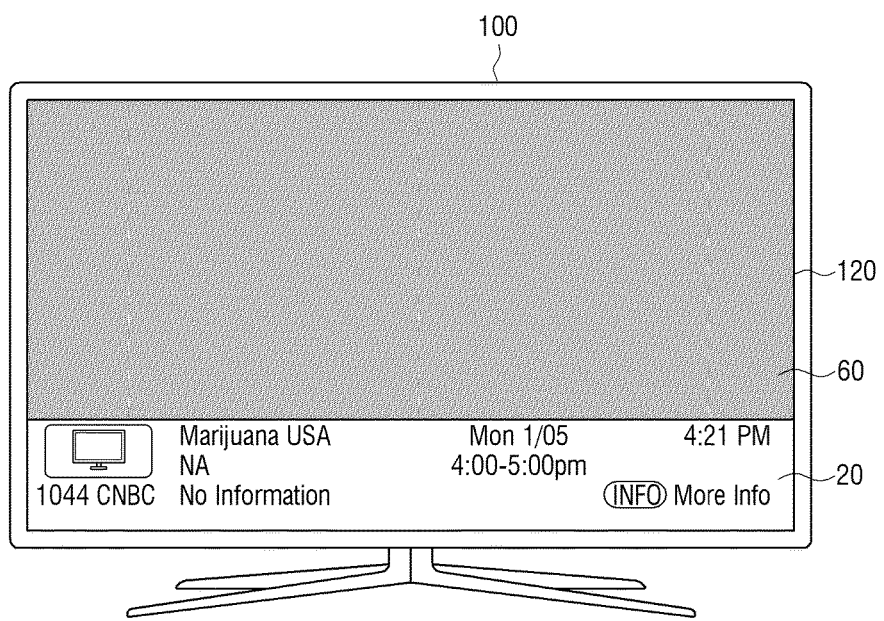
FIG. 7 is a view provided to describe an example where a black image is displayed as the predetermined condition of FIG. 6 according to an exemplary embodiment of the present disclosure.

FIG. 7 is a view provided to describe an example where a black image is displayed as the predetermined condition of FIG. 6.

Referring to FIG. 7, in response to a channel being changed as the user presses a channel change button on the display device 100 or a channel change button on a remote controller, a black image 60 where only the OSD 20 is displayed without any displayed image is displayed for a certain time. The display device 100 may collect images in the section and detect the other area excluding the black area as the OSD.

Figure 8:
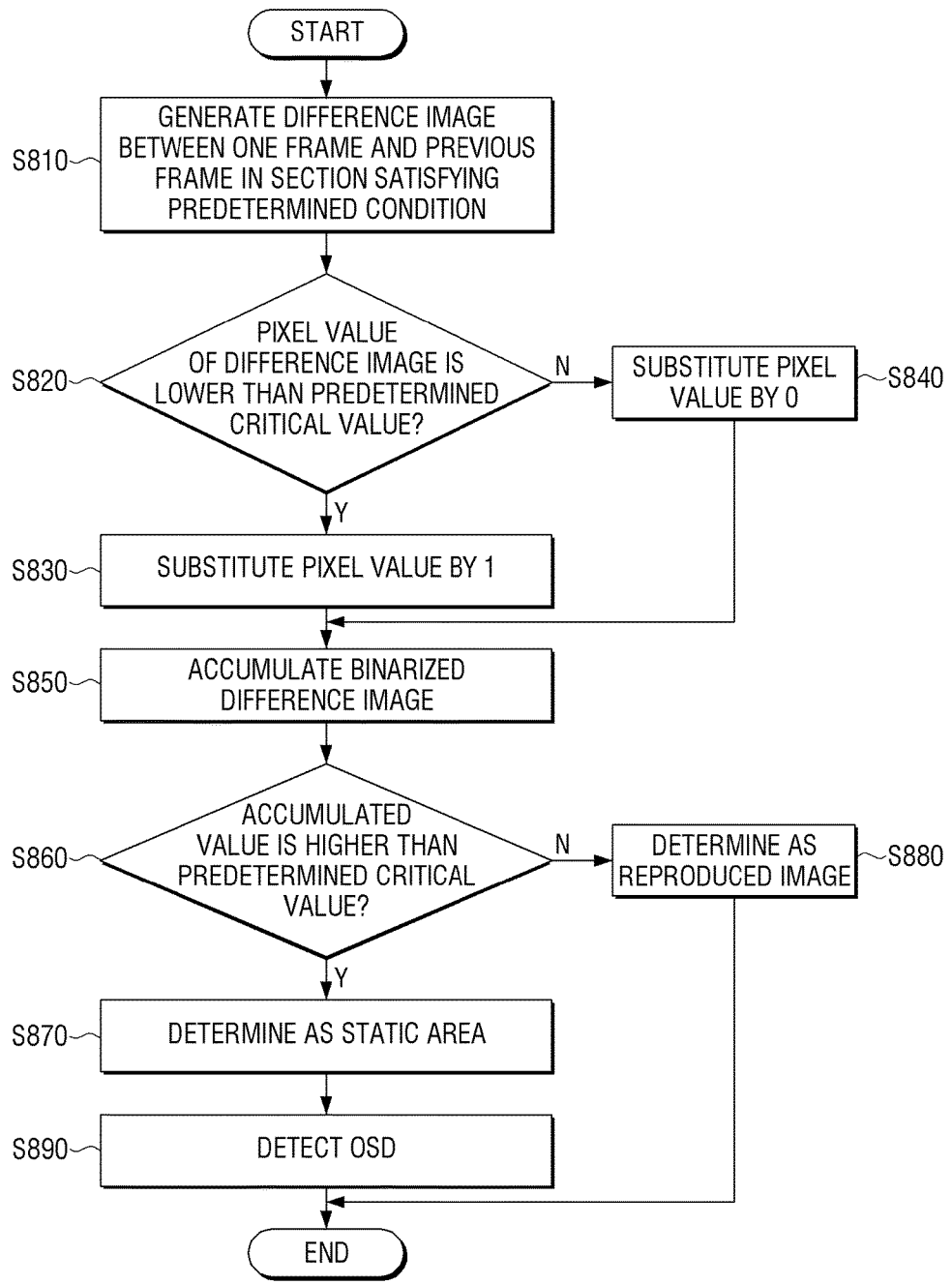
FIG. 8 is a flowchart provided to describe a method for detecting an OSD according to an exemplary embodiment of the present disclosure.

FIG. 8 is a flowchart provided to describe a method for detecting an OSD according to an exemplary embodiment of the present disclosure.

The OSD has a relatively less variation than a reproduced image which is continuously changed. Accordingly, the display device 100 may detect the OSD by using such characteristic of the OSD. Referring to FIG. 8, the display device 100 generates a difference image between one frame and a previous frame of the one frame in the section satisfying the predetermined condition (S810). In this case, the difference image refers to an image for identifying a moving static area or an unmoving static area by using a difference between two frames.

The display device 100 determines whether a pixel value of each pixel of the difference image is lower than a predetermined critical value (S820) and binarizes the difference image. To be specific, in response to determining that a pixel value of an area is lower than the predetermined critical value (S820-Y), the display device 100 substitutes the pixel value of the area by '1' (S830). In addition, in response to determining that a pixel value of an area is higher than the predetermined critical value (S820-N), the display device 100 substitutes the pixel value of the area by '0' (S840). In this case, the pixel value of the difference image being lower than the predetermined critical value represents that the pixel values of both frames are the same or almost the same as each other.

In this case, the predetermined critical value of the pixel value may be set by the manufacturer in a manufacturing process or set by a user.

Subsequently, the display device 100 accumulates the binarized difference image (S850). According to the accumulation of the binarized difference image, a value in an area having little variation of the pixel value in each frame may be relatively high, and a value in an area having a varying pixel value in each frame may be relatively low.

After accumulating the binarized difference image, the display device 100 determines whether the accumulated value is higher than the predetermined critical value (S860). To be specific, in response to determining that the accumulated value of an area is higher than the predetermined critical value (S860-Y), the display device 100 determines the area as a static area having no image change (S870). In addition, in response to determining that the accumulated value of an area is lower than the predetermined critical value (S860-N), the display device 100 determines the area as a reproduced image where the image is changed (S880).

Subsequently, the display device 100 detects the area being determined as the static area having little image change as an overlaid OSD (S890). The display device 100 may generate and store an OSD template based on the detected OSD.

A detailed description on the operation of extracting a content of the detected OSD will be provided below with reference to FIGS. 11 and 12.

Figure 9:
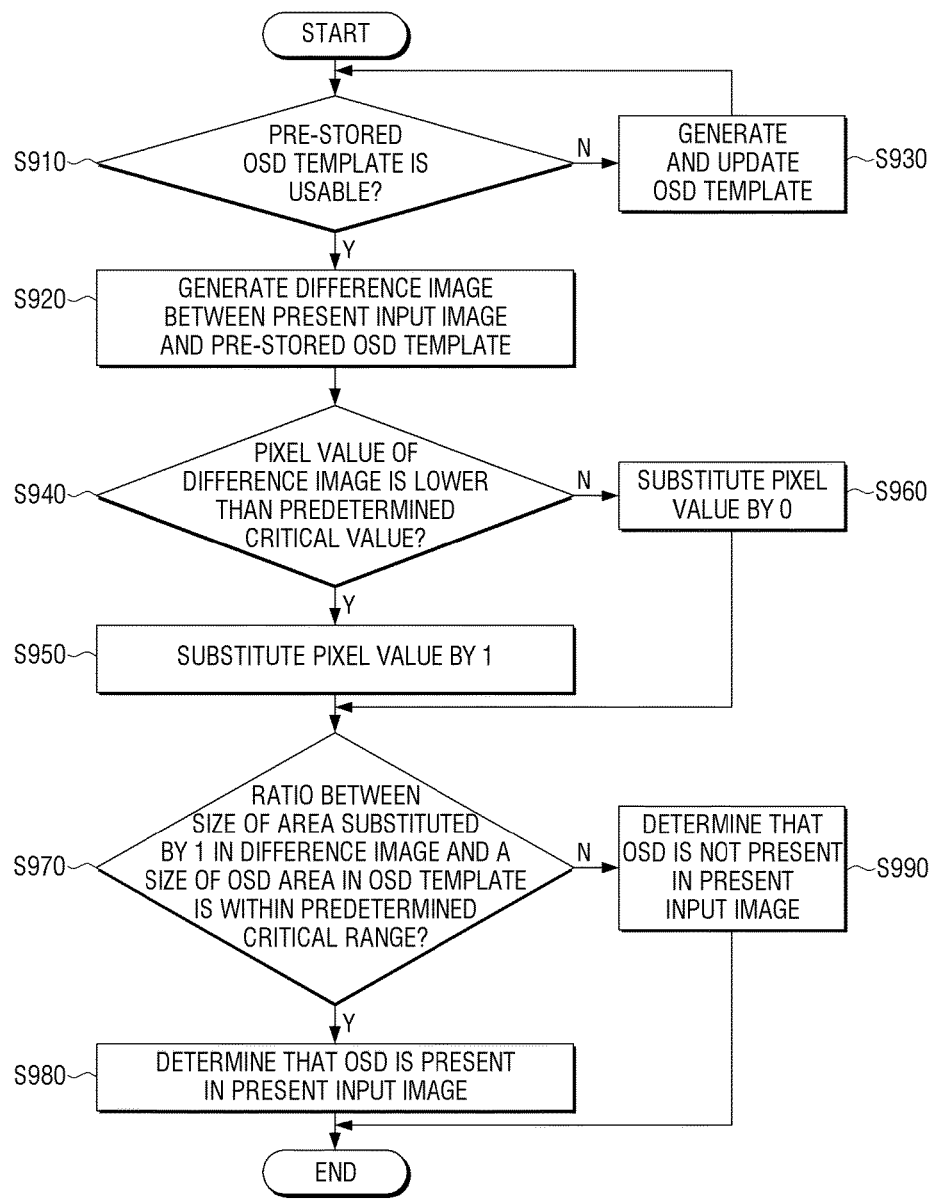
FIG. 9 is a flowchart provided to describe a method for detecting an OSD according to another exemplary embodiment of the present disclosure.

FIG. 9 is a flowchart provided to describe a method for detecting an OSD according to another exemplary embodiment of the present disclosure.

Referring to FIG. 9, the display device 100 determines whether a pre-stored OSD template is usable (S910). To be specific, the display device 100 determines whether the OSD template generated and stored through the operation of FIG. 8 is an OSD template which is usable for the present input image. In response to determining that the OSD template is unusable (S910-N), the display device 100 generates and updates a new OSD template through the operation of FIG. 8 (S930).

In response to determining that the OSD template is usable for the present input image (S910-Y), the display device 100 generates a difference image between the present input image and the pre-stored OSD template (S920).

Subsequently, the display device 100 determines whether a pixel value of each pixel of the difference image is lower than the predetermined critical value (S940) and binarizes the difference image. To be specific, in response to determining that a pixel value of an area is lower than the predetermined critical value (S940-Y), the display device 100 substitutes the pixel value of the area by '1' (S950). In addition, in response to determining that a pixel value of an area is higher than the predetermined critical value (S940-N), the display device 100 substitutes the pixel value of the area by '0' (S960). In this case, the pixel value of the difference image being lower than the predetermined critical value represents that the pixel values of both frames are the same or almost the same as each other.

In this case, the predetermined critical value of the pixel value may be set by the manufacturer in the manufacturing process or set by a user.

Subsequently, the display device 100 determines whether a ratio between a size of the area substituted by '1' in the binarized difference image and a size of an OSD area in the OSD template is within a predetermined critical range (S970). In this case, the display device 100 may calculate the size of the area substituted by '1' and the size of the OSD area in the OSD template by counting the number of pixels in each frame. To be specific, the display device 100 may count the number of pixels substituted by '1' in the binarized difference image to calculate the size of the area substituted by '1'. In addition, the display device 100 may count the number of pixels of which pixel value is not '0' in the OSD template to calculate the size of the OSD area in the OSD template.

The display device 100 may calculate the ratio between the area of the binarized difference image and the area of the OSD template and determine whether the calculated ratio is within the predetermined critical range. In this case, the display device 100 may calculate a ratio between the number of pixels counted from the difference image and the number of pixels counted from the OSD template and determine the ratio of the sizes of the areas.

To be specific, in response to determining that the ratio between the size of the area substituted by '1' in the binarized difference image and the size of the OSD area in the OSD template is within the predetermined critical range (S970-Y), the display device 100 determines that an area which is the same as the pre-stored OSD template exists, and the OSD is present in the present input image (S980). In addition, in response to determining that the ratio between the size of the area substituted by '1' in the binarized difference image and the size of the OSD area in the OSD template is not within the predetermined critical range (S970-N), the display device 100 determines that an OSD is not present in the present input image (S990).

In this case, the predetermined critical value of the ratio of the sizes may be set by the manufacturer in the manufacturing process or set by a user.

Figure 10:
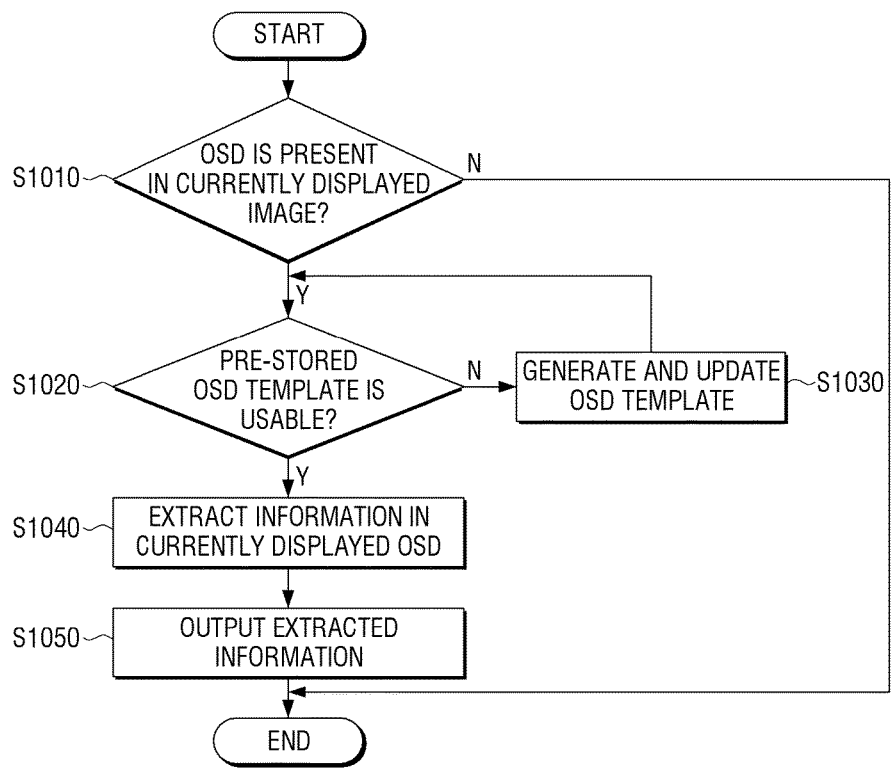
FIG. 10 is a flowchart provided to describe a method for extracting information included in an OSD according to another exemplary embodiment of the present disclosure.

FIG. 10 is a flowchart provided to describe a method for extracting information included in an OSD detected by using an OSD template according to another exemplary embodiment of the present disclosure.

Referring to FIG. 10, the display device 100 determines whether an OSD is present in a currently displayed image (S1010). To be specific, the display device 100 may determine whether an OSD is present in the currently displayed image through the operation of FIG. 9.

In response to determining that the OSD is present in the currently displayed image (S1010-Y), the display device 100 determines whether the pre-stored OSD template is usable (S1020). In response to determining that the OSD is unusable (S1020-N), the display device 100 generates and updates a new OSD template through the operation of FIG. 10 (S1030).

In this case, the OSD template refers to a content included in an OSD, that is, pre-stored information on a location, form, and design, such as, a channel number, a channel name, a program name, a broadcasting time, and the like.

In response to determining that the OSD template is usable for the currently displayed image (S1020-Y), the display device 100 extracts information included in the currently displayed OSD (S1040). The display device 100 may store the extracted information in the storage 130 and output the extracted information, for example by providing the user with a recommended content or a notification for a preferred program by using the extracted information (S1050).

In the above exemplary embodiment, information in an OSD is extracted by using an OSD template including location information on the information in the OSD. However, in the implementation, information in an OSD may be extracted by means of methods of FIGS. 11 and 12, without generating an OSD template.

Figure 11:
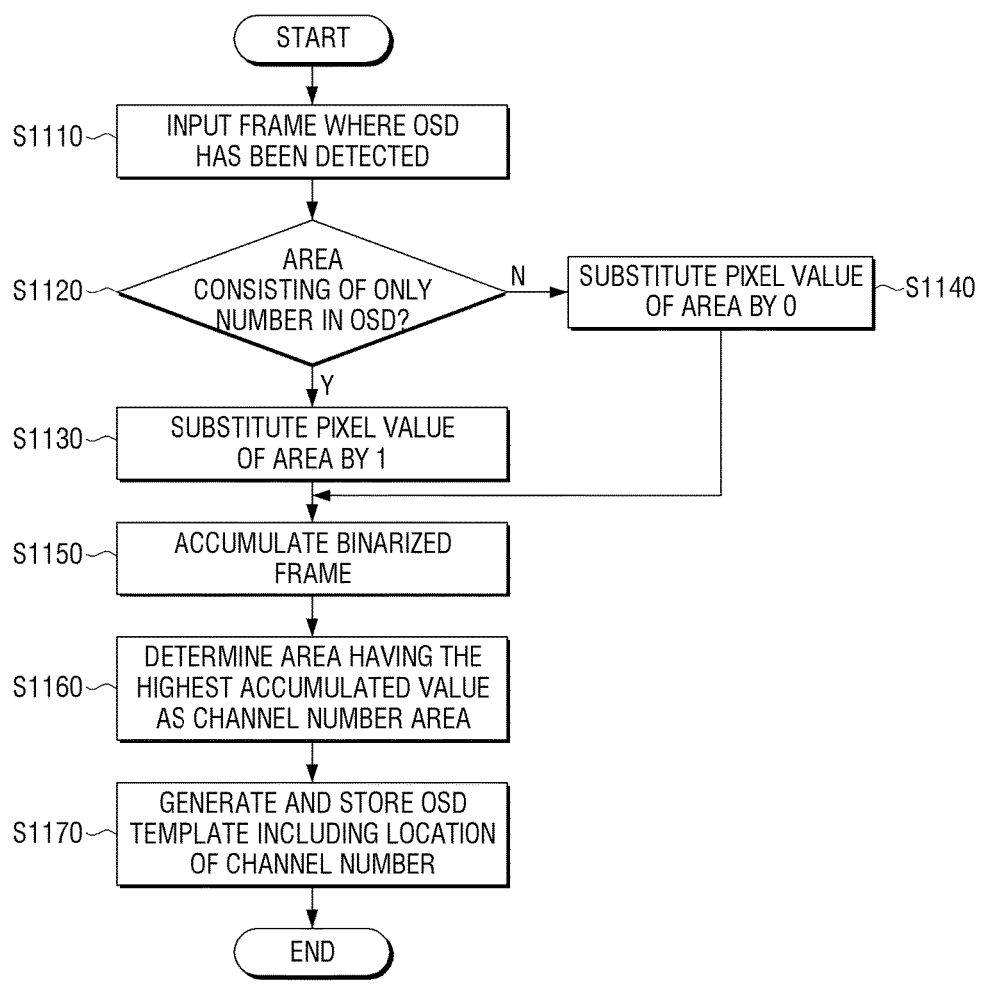
FIG. 11 is a flowchart provided to describe a method for generating an OSD template according to an exemplary embodiment of the present disclosure.

FIG. 11 is a flowchart provided to describe a method for generating an OSD template for extracting a channel number from information included in an OSD according to an exemplary embodiment of the present disclosure.

Referring to FIG. 11, the display device 100 inputs a frame from which an OSD has been detected from the currently displayed image (S1110). Detecting a frame where an OSD is overlaid may be performed by directly detecting an OSD-overlaid frame from the currently displayed image according to the method of FIG. 8 or by detecting an OSD-overlaid frame by comparing a stored OSD template with the currently displayed image according to the method of FIG. 9.

Subsequently, the display device 100 detects an area consisting of only numbers from the OSD (S1120). To be specific, the display device 100 may use the character recognition method including the OCR. The display device 100 may recognize entire characters in the OSD by means of the character recognition method and detect only a number area excluding a mark (colon (:), semicolon (;), comma (,) and the like), a number adjacent to the mark, and a character (English letter or Han-gul) from among the recognized characters.

The display device 100 substitutes a pixel value of the detected number area (S1120-Y) by '1'(S1130). In addition, the display device 100 substitutes the other area (S1120-N) than the detected number area among the recognized characters by '0' (S1140).

Subsequently, the display device 100 accumulates the binarized difference image (S1150). According to the accumulation of the binarized difference image, a value in the area consisting of only the numbers may be relatively high, and a value of the other area than the area consisting of only the numbers in the OSD-overlaid frame may be '0' or may be be relatively low.

An area where a channel number is displayed in the OSD is generally the area consisting of only the numbers. Accordingly, the display device 100 accumulates the binarized frame and determines that an area where the accumulated value is the highest as a channel number area (S1160).

Subsequently, the display device 100 generates an OSD template including a location of the determined channel number area and stores the generated OSD template in the storage (S1170). In the above exemplary embodiment, the channel number is extracted by generating an OSD template including a location of the channel number area and comparing the OSD template with the present input image. However, in the implementation, the channel number in the determined channel number area may be extracted directly without generating and storing an OSD template including a location of the channel number.

Figure 12:
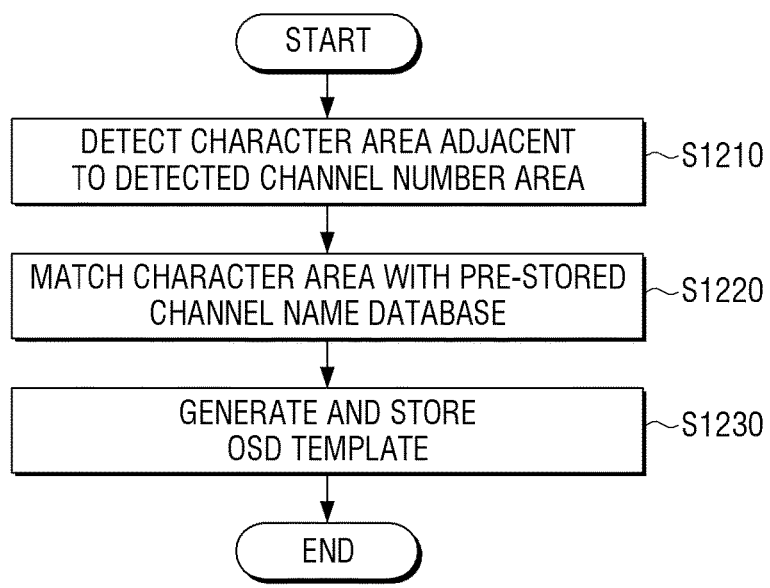
FIG. 12 is a flowchart provided to describe a method for generating an OSD template according to an exemplary embodiment of the present disclosure.

FIG. 12 is a flowchart provided to describe a method for generating an OSD template for extracting a channel name from information in an OSD according to an exemplary embodiment of the present disclosure.

Referring to FIG. 12, the display device 100 inputs a frame from which an OSD has been detected from a currently displayed image.

The display device 100 detects a character area which is the closest to the detected channel number area in the OSD (S1210) because the channel name is displayed in an area adjacent to the channel number. Subsequently, the display device 100 matches the detected character area with a pre-stored channel name database and determines whether the detected character area is an area where the channel name is displayed (S1220), because the channel name is provided in the limited number suitable for using a database. In addition, this operation may reduce an error in extracting information.

In response to determining that the detected character area is matched with the database, the display device 100 determines that the matched character area as a channel name area. Subsequently, the display device 100 generates and stores an OSD template including a location of the channel name area (S1230). In response to determining that the detected character area is not matched with the database, the display device 100 may detect a character area which is the second-closest to the channel number area and matches the detected character area with the channel name database to detect a channel name area.

In the above exemplary embodiment, the channel name is extracted by generating an OSD template including a location of the channel name and comparing the OSD template with the present input image. However, in the implementation, the channel name may be extracted by matching a channel name of the determined channel name area with a database without generating and storing an OSD template including a location of the channel name.

Meanwhile, in FIGS. 11 and 12, only the method for extracting a channel number and a channel name from the information included in an OSD has been described. However, in the implementation, various information in an OSD may be extracted by detecting a number area including a colon to determine an area where a time is displayed or by detecting a character area adjacent to the area determined as a channel number area or a channel name area to determining an area where a program name is displayed.

Figure 13:
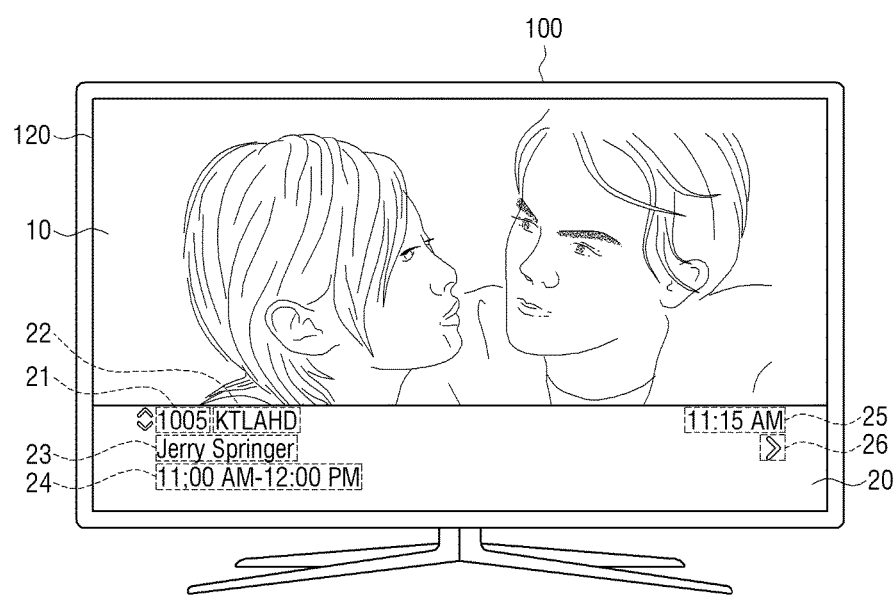
FIG. 13 is a view provided to describe information included in an OSD according to an exemplary embodiment of the present disclosure.

FIG. 13 is a view provided to describe information included in an OSD according to an exemplary embodiment of the present disclosure.

Referring to FIG. 13, the display 120 of the display device 100 may display an image 10 received from an external device. In this case, the displayed image 10 may include an OSD 20 including channel information on the image. Information included in the OSD 20 may include a channel number 21, a channel name 22, a program name 23, a broadcasting time 24, a current time 25, and a tab 26 for viewing detailed information on a program, and the like. However, in the implementation, the information included in the OSD may include various information, such as, information on a previous or next program, a date, a menu, an emblem of a broadcasting station, a program-preference display, and so on.

As described above, according to various exemplary embodiments, the display device may extract the information included in an OSD by automatically recognizing a form of the OSD in an image without receiving preliminary information on the form of the OSD from an external source and provide the user with convenience by using the extracted information.

The methods in the above exemplary embodiments may be realized in a form of a program command which is executable by diverse computer means and recorded in a computer-readable recording medium. The computer-readable recording medium may include a program command, a data file, a data structure, or a combination thereof. For example, the computer-readable recording medium may be stored in a volatile or non-volatile recording medium including a ROM, a memory including a RAM, a memory chip, a device, or an integrated circuit, or a recording medium including a Compact Disk (CD), a Digital Versatile Disk (DVD), a magnetic disk, a magnetic tape, which may be recorded optically or magnetically, and may be read by a machine (for example, a computer), regardless of whether or not data is deletable or rewritable. The computer-readable recording medium may be an example of a recording medium which is readable by a machine suitable for storing a program or programs including instructions for executing the exemplary embodiments of the present disclosure. The program command recorded in the recording medium may be specially designed and configured for the present disclosure or may be publicly known to those skilled in the art of computer software.

As above, a few exemplary embodiments have been shown and described. The foregoing exemplary embodiments and advantages are merely exemplary and are not to be construed as limiting. The present teaching can be readily applied to other types of devices.

Also, the description of the exemplary embodiments is intended to be illustrative, and not to limit the scope of the claims, and many alternatives, modifications, and variations will be apparent to those skilled in the art.

What is claimed is:

1. A display device comprising:
   a transceiver;
   a display; and
   a processor configured to:
      based on receiving an input image through the transceiver, obtain a plurality of difference images based on a plurality of frames included in a predetermined section of the input image and a plurality of previous frames corresponding to the plurality of frames, and identify whether a frame included in the predetermined section comprises an On Screen Display (OSD) based the plurality of difference images, the identifying comprising accumulating the plurality of difference images and identifying a static area in which an accumulated pixel value of the plurality of different images is higher than a predetermined value as the OSD, the predetermined section comprising at least one of a section in which a black image is displayed on a part of the input image on the display and a section within a predetermined time after occurrence of a silence in an audio signal associated with the input image, and the processor being further configured to generate an OSD template corresponding to the input image based on the identified OSD not being matched with a pre-stored OSD template.

2. The device as claimed in claim 1, wherein the processor is further configured to generate the OSD template including at least one from among location information or form information associated with the identified OSD, and to store the generated OSD template in a memory of the display device.

3. The device as claimed in claim 2, wherein the processor is further configured to binarizing the plurality of difference images, accumulating the binarized difference images, and identifying an area in which an accumulated value associated with the area, the accumulated value being generated by the accumulating, exceeds a predetermined value as an OSD area.

4. The device as claimed in claim 2, wherein the processor is further configured to compare a currently displayed image with the stored OSD template and to identify whether the OSD is overlaid on the currently displayed image.

5. The device as claimed in claim 4, wherein the processor is further configured to binarize the obtained difference images, and when a ratio between a size of an area substituted by '1' in the binarized difference images and a size of an OSD area in the OSD template being within a predetermined range, to identify that the OSD is included in the currently displayed image.

6. The device as claimed in claim 2, wherein the processor is further configured to extract the information included in the identified OSD.

7. The device as claimed in claim 6, wherein the information comprises at least one of a channel number, a channel name, a current time, a program name, a program broadcasting time, and program information.

8. The device as claimed in claim 6, wherein the processor is further configured to extract the information included in the identified OSD based on a pre-stored OSD template, wherein the OSD template comprises location information associated with the information.

9. The device as claimed in claim 8, wherein the OSD template is generated by detecting an area in the identified OSD comprising numbers using a character recognition method, identifying the detected area as a channel number area, detecting a character area adjacent to the identified channel number area, matching the detected character area with a pre-stored channel name database, and identifying the character area as a channel name area.

10. A method for controlling a display device, the method comprising:

receiving an input image from an external device;

obtaining a plurality of difference images based on a plurality of frames and a plurality of previous frames corresponding to the plurality of frames in a predetermined section of the input image;

identifying whether a frame included in the predetermined section comprises an On Screen Display (OSD) based the plurality of difference images;

the identifying comprising accumulating the plurality of difference images and identifying a static area in which an accumulated pixel value of the plurality of different images is higher than a predetermined value as the OSD;

the predetermined section comprising at least one of a section in which a black image is displayed on a part the displayed input image and a section within a predetermined time after occurrence of a silence in an audio signal associated with the input image; and generating an OSD template corresponding to the input image based on the identified OSD not being matched with a pre-stored OSD template.

11. The method as claimed in claim 10, further comprising:

storing the generated OSD template, wherein the generated OSD template includes at least one from among location information or form information associated with the identified OSD.

12. The method as claimed in claim 11, wherein the generating the OSD comprises:

binarizing the difference images;

accumulating the binarized difference images; and identifying an area in which an accumulated value associated with the area, the accumulated value being generated by the accumulating, exceeds a predetermined value as an OSD area.

13. The method as claimed in claim 11, further comprising:

comparing a currently displayed image with the stored OSD template and identifying whether the OSD is overlaid on the currently displayed image.

14. The method as claimed in claim 13, wherein the identifying comprises:

binarizing the obtained difference images; and when a ratio between a size of an area substituted by '1' in the binarized difference images and a size of an OSD area in the OSD template is within a predetermined range, determining that the OSD is overlaid on the currently displayed image.

15. The method as claimed in claim 11, further comprising:

extracting the information included in the identified OSD.

16. The method as claimed in claim 15, wherein the information comprises at least one of a channel number, a channel name, a current time, a program name, a program broadcasting time, and program information.

17. The method as claimed in claim 15, wherein the extracting the information comprises extracting information included in the identified OSD based on a pre-stored OSD template, wherein the OSD template comprises location information on the information.

18. The method as claimed in claim 17, wherein the generating the OSD template comprises:

detecting an area comprising numbers using a character recognition method;

identifying the detected area as a channel number area;

detecting a character area adjacent to the identified channel number area; and matching the detected character area with a pre-stored channel name database and identifying the character area as a channel name area.

19. A non-transitory computer-readable recording medium with a program for executing a method for controlling a display device, the method comprising:
- receiving an input image from an external device;
- obtaining a plurality of difference images based on a plurality of frames and a previous frames corresponding to the plurality of frames in a predetermined section of the input image;
- identifying whether a frame included in the predetermined section comprise On Screen Display (OSD) based the plurality of difference images;
- the identifying comprising accumulating the plurality of difference images and identifying a static area which an accumulated pixel value of the plurality of different images is higher than a predetermined value as the OSD;
- the predetermined section comprising at least one of a section which a black image being displayed on a part the displayed input image and a section within a predetermined time after occurrence of a silence in an audio signal associated with the input image; and
- generating an OSD template corresponding to the input image based on the identified OSD not being matched with a pre-stored OSD template.

* * * * *